United States Patent [19]

Asai

[11] 4,364,115
[45] Dec. 14, 1982

[54] APPARATUS FOR DIGITAL DIVISION COMPUTATION

[76] Inventor: Hitohisa Asai, 892 Catalina Dr., Newport News, Va. 23602

[21] Appl. No.: 959,269

[22] Filed: Nov. 9, 1978

Related U.S. Application Data

[63] Continuation-in-part of Ser. No. 816,595, Jul. 18, 1977, abandoned.

[51] Int. Cl.³ .............................................. G06F 7/52
[52] U.S. Cl. .................................................... 364/765
[58] Field of Search ............... 364/761, 762, 764, 765, 364/766

[56] References Cited

U.S. PATENT DOCUMENTS

| | | | |
|---|---|---|---|
| 3,234,367 | 2/1966 | Ottaway et al. | 364/761 |
| 3,736,413 | 5/1973 | Ferguson | 364/761 |
| 3,828,175 | 8/1974 | Amdahl et al. | 364/765 |
| 3,917,935 | 11/1975 | Lazecki | 364/761 |
| 4,025,773 | 5/1977 | Bennett | 364/765 |

OTHER PUBLICATIONS

A. Svoboda, "An Algorithm for Division," *Information Processing Machines*, No. 9, 1963, pp. 25–34.
D. Ferrari, "A Division Method Using a Parallel Multiplier," *IEEE Trans. on Elect. Computers*, Apr. 1967, pp. 224–226.

*Primary Examiner*—Jerry Smith
*Attorney, Agent, or Firm*—Norman B. Rainer

[57] ABSTRACT

A division A/B where A and B are represented in a radix D (assuming the absolute value of D is greater than one) can be accomplished by evaluating a power series. It is very important not only for the power series to converge but also to converge quickly in practical application. When the convergence rate of the power series is close to one, the convergence is slow. Usually it results in lengthy and time-consuming computation to obtain a reasonably good approximation of the reciprocal of the divisor B. The invention that accelerates the convergence could be used in a digital computation system for performing a faster division A/B. In digital system, the dividend A and the divisor B are stored in digital registers. This invented apparatus determines acceleration constants from the stored digits of the divisor B and the determinate constants are multiplied to the stored numbers A and B. Then, the convergence rate of the power series of A'/B' where A' and B' are the constant multiplied A and B, respectively, becomes a smaller number so that an evaluation of the power series can be performed very quickly. Thus, the power series implementation to division process is useful in practical application.

10 Claims, 9 Drawing Figures

SOLID LINE AND DOTTED LINE INDICATE DATA TRANSFERRING PATH AND CONTROL PATH, RESPECTIVELY, AND THE PARENTHESES IN EACH REGISTER INDICATE THE CONTENT OF THE REGISTER

| SUB-DIVISION NUMBER | LOWER LIMIT | $q$ | UPPER LIMIT |
|---|---|---|---|
| 1 | $566.66\cdots < q \leq$ | | $900.00\cdots$ |
| 2 | $300.00\cdots < q \leq$ | | $566.66\cdots$ |
| 3 | $185.71\cdots < q \leq$ | | $300.00\cdots$ |
| 4 | $122.22\cdots < q \leq$ | | $185.71\cdots$ |
| 5 | $81.81\cdots < q \leq$ | | $122.22\cdots$ |
| 6 | $53.84\cdots < q \leq$ | | $81.81\cdots$ |
| 7 | $33.33\cdots < q \leq$ | | $53.84\cdots$ |
| 8 | $17.64\cdots < q \leq$ | | $33.33\cdots$ |
| 9 | $5.263\cdots < q \leq$ | | $17.64\cdots$ |
| 10 | $0.00\cdots < q \leq$ | | $5.263\cdots$ |

WHERE $\varepsilon$ AND $\alpha$ ARE AN ERROR TOLERANCE AND AN APPROXIMATED QUOTIENT OF $1/B$ RESPECTIVELY

THE STOP(ENDING) CONDITION OF A DIVISION COMPLETION IS A DETECTION OF A SIGNAL $S(Q_{k+1} \leq C)$, SOLID LINE AND DOTTED LINE INDICATE DATA TRANSFERRING PATH AND CONTROL PATH, RESPECTIVELY

FIG. 8

APPARATUS FOR DIGITAL DIVISION COMPUTATION

RELATED APPLICATIONS

This application is a continuation-in-part of application Ser. No. 816,595, filed on July 18, 1977 and now abandoned.

BACKGROUND OF THE INVENTION

This invention relates to a method and apparatus for division in a digital computation. This invention is particularly useful for implementing the power series to an electronic digital computer system.

Heretofore, it has been suggested to implement a multiplication method to division process. One technique described in "The IBM System/360 Model 91: Floating-Point Execution Unit" IBM Journal of Res. & Develop. Vol. 11 No. 1, 1967 pp. 34–54 by S. F. Anderson et al. suggests that a succession of factor multiplications to the dividend and divisor leads to the results; an approximated quotient and one, respectively. The selection of the multiplying constant $a_k$ is the essential part of the procedure. This procedure is shown:

$$A/B = Aa_0a_1a_2a_3a_4a_5 \ldots / Ba_0a_1a_2a_3a_4a_5 \ldots$$

$Aa_0a_1a_2a_3a_4 \ldots a_n$ is an approximated quotient, when $Ba_0a_1a_2a_3a_4 \ldots a_n$ is approaching to one. The divisor can be expressed as $C=1-x$ where $x \leq \frac{1}{2}$, since C is a bit-normalized, binary floating-point fraction of the form 0.1yyy.... Now, if the constant $a_0$ is set equal to $1+x$ and the divisor is multiplied by $a_0$, then $C_1 = Ca_0 = (1-x)\cdot(1+x) = 1-x^2$ where $x^2 \leq \frac{1}{4}$. The new divisor is guaranteed to have the form 0.11yyy.... Likewise, select $a_1 = 1+x^2$ with double the leading 1 on the next iteration to yield $C_2 = C_1a_1 = (1-x^2)\cdot(1+x^2) = 1-x^4$ where $x^4 \leq 1/16$. In general, if $x_i \leq (\frac{1}{2})^n$ then $x_{i+1} \leq (\frac{1}{2})^{2n}$. Thus, by continuing the multiplication until $x_i$ is less than the least significant digit (bit) of the divisor (division fraction), the desired result, namely a denominator (a constant multiplied divisor) equivalent to one ($=0.111\ldots 111\ldots$) is obtained. The multiplier $a_i$ for each succession is the two's complement of the denominator $a_i = 2 - a_{i-1} = 2 - (1-x_{i-1}) = 1 + x_{i-1}$.

The first multiplier $a_0$ is generated by a table-lookup which inspects the first seven bits of the divisor. The first multiply guarantees a result which has seven similar bits to the right of the binary point ($1+x$ has the form $\overline{b}.bbbbbbb\ldots$ etc.) where $\overline{b}$ is the negated number of b. The following sequence outlines the operations: (1) determine the first multiplier by a table-lookup, (2) multiply B by $a_0$ forming $B_1$, (3) multiply A by $a_0$ forming $A_1$, (4) truncate $B_i$ and complement to form $a_i$, (5) multiply $A_i$ by $a_i$ forming $A_{i+1}$, (6) multiply $B_i$ by $a_i$ forming $B_{i+1}$, (7) iterate on (4), (5), and (6) until $B_{i+n}$ approaches one and then $A_{i+n}$ becomes an approximated quotient of the division A/B.

It is one object of the present invention to provide a method and apparatus for performing division A/B.

It is another object to accomplish a division process quickly by evaluating a power series.

Other objects and features of the present invention will be apparent in view of the following general and specific descriptions of embodiments of the invention.

SUMMARY OF THE INVENTION

In accordance with a principal feature of the present invention, the digital number q of the divisor $B=D^n+q$ (where D is a base radix, $D^n$ is a pseudoradix and the domain of q is in $0 \leq q \leq D^n(D-1)$) is successively used in order to obtain acceleration constant $a_i$ for $i=0,1,2,\ldots$, and in accordance with a recursive application of an acceleration determining process described herein, the successively multiplied result of the division A/B by acceleration constants guarantees a small covergence rate of the power series so that the division process is accomplished by evaluating a few terms in the power series.

The apparatus comprises a control unit comprised of sequential circuitry, a divisor register comprised of a row of associated flipflops, a dividend/quotient register comprised of a row of associated flipflops, multiplication means, a counter unit comprised of structured circuitry with feedback loops, an adding unit, and a logic unit comprised of sequential logical circuitry, said components being interfaced in a manner to accomplish the computational process of this invention.

BRIEF DESCRIPTION OF THE DRAWING

In the accompanying drawing forming a part of this specification and in which similar numbers of reference indicate corresponding parts in all the figures of the drawing.

DETAILED DESCRIPTION OF THE INVENTION

A division A/B where A and B are represented in a radix D can be accomplished by evaluating a power series $$A/B = A\{1 - P/D + (P/D)^2 - (P/D)^3 + (P/D)^4 - \ldots\}/D \qquad (1)$$

if $|P/D|$ is less than one where $B=D+P$. This evaluation does not involve any division since $(1/D)^i$ is a digit shift operation to the left by i-digits. The series evaluates the reciprocal of a constant B. When a pseudoradix $D'$ is introduced such that $D'=D^n$ with $|D^n| > |B|$ for the smallest integer $n=1,2,3,\ldots$, the convergence condition $|P/D'|<1$ in (1) is always satisfied. We shall call n the power of a pseudoradix. However, when $|P/D'|$ is close to one, the convergence rate of (1) is slow and the division process of power series evaluation (1) is practically useless due to the required computation of many terms in (1). Since the truncation error $|\epsilon|$ at the $i^{th}$ term of (1) is given by $|A/B| \cdot |P/D|^i$, the number i could be a large quantity to obtain a small $|\epsilon|$. When such a slower convergence of the power series in division is observed, this invention forces the division to converge quickly by providing an acceleration factor. Thus, the power series implementation becomes practical and useful.

A number B (a divisor) having a radix D is represented generally as:

$$B = D^n + P$$

where for example the radix is ten and the number B is 189, then the pseudoradix is $D^2 = 100$ and P is 89. When the power is increased by one the value of P, for a given B, becomes a negative number. For example B is 189 in the radix ten and n is 3, then $D^3 = 1000$ and $P = -811$. For the sake of simlicity, we introduce a positive quantity q for P. Thus the value P can be described with q.

$$P = q \text{ if } P > 0 \quad (2\text{-a})$$

$$P = (D^n + q) - D^{n+1} \text{ if } P < 0 \quad (2\text{-b})$$

Note: when $P = 0$, namely $B = D' = D^n$ or $D^{n+1}$, the reciprocal of B becomes $1/D'$, that being just a digit shift operation. Now the ratio $P/D'$ in (1) is represented by functions of q:

$$P/D^n = f_1(q) = q/D^n \text{ for } P > 0 \quad (3\text{-a})$$

$$P/D^{n+1} = -f_2(q) = -\{D^{n+1} - (D^n + q)\}/D^{n+1} \text{ for } p < 0 \quad (3\text{-b})$$

From equations (2) the domain of q is $0 \leq q \leq D^n(D-1)$ where $D^n$ is a pseudoradix. Since q depends on the pseudoradix, the domain may be considered a fixed interval $0 \leq q \leq D'(D-1)$ relative to a pseudoradix $D'$.

Let us consider an overrelaxation of $f_2(q)$ with a parameter 'a'. We have $$g(q,a) = \{D^{n+1} - a(D^n + q)\}/D^{n+1} = -aq/D^{n+1} + (D-a)/D \quad (4)$$

where 'a' is an integer in the domain $1 \leq a \leq D$. Note: as special cases, $g(q,1) = -f_2(q)$ and $g(q,D) = -f_1(q)$. The functions $f_1(q)$, $f_2(q)$, and the family of $g(q,a)$ for $a = 2, 3, 4, \ldots, D-1$ are illustrated in FIG. 1.

Figure 1:
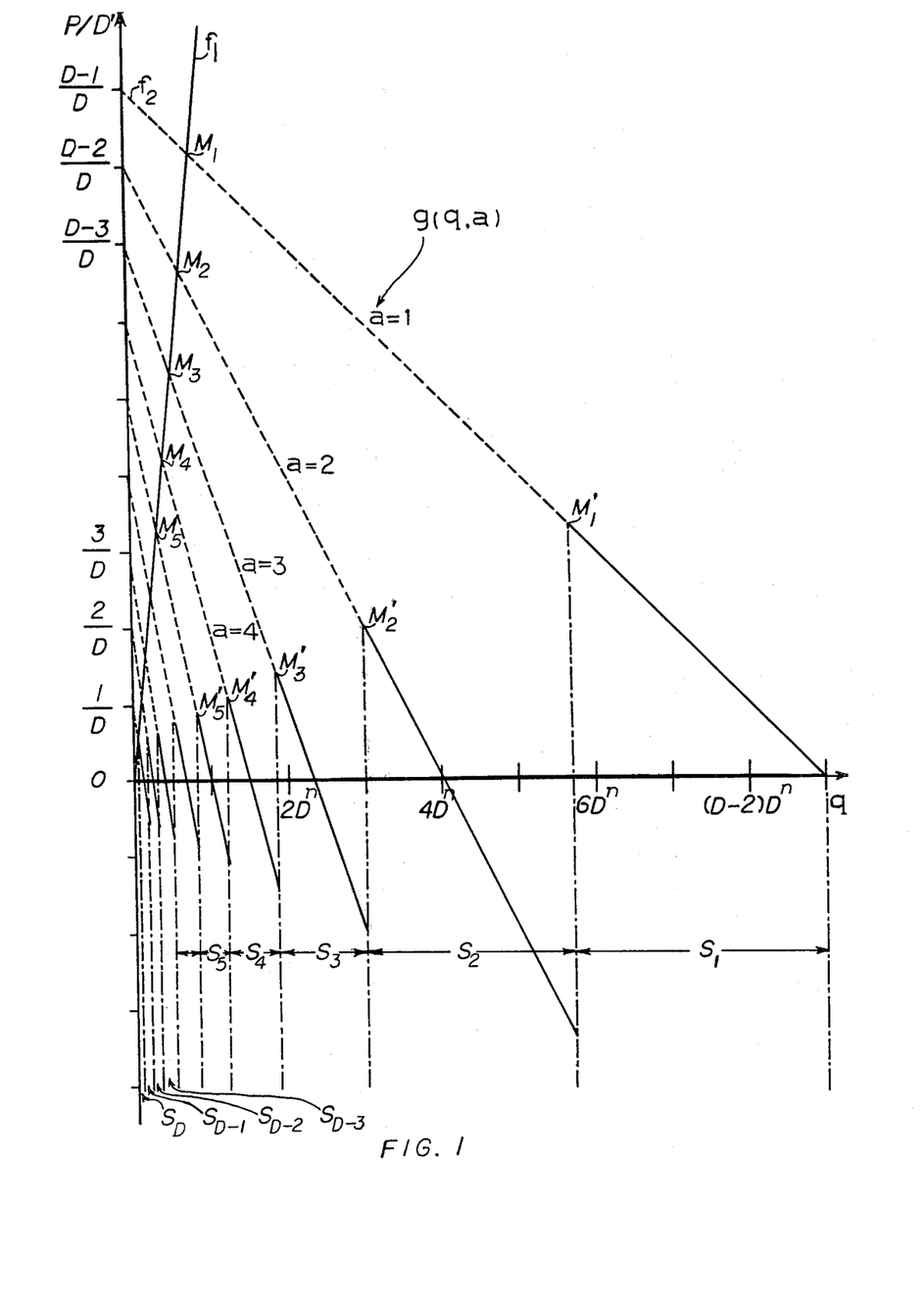
FIG. 1 is a graph showing mathematical functions and boundaries of different acceleration constants applicable to the value q.

The intersections between $f_1(q)$ and the family of $g(q,a)$ are marked with $M_a$ for $a = 1, 2, \ldots, D$ in FIG. 1. Consider the saw shaped zig-zag lines crossing the abscissa which are connected to another line of the family by equating $-g(q^+,a) = g(q^+,a-1)$ for $a = 2, 3, \ldots, D$. The quantity of $q^+$ is $$q^+(a) = (2D - 2a + 1)D^n/(2a - 1) \quad (5)$$

where 'a' is regarded as an argument of $q^+$. The points of $q^+(a)$ appear with the mark $M_a'$ in FIG. 1. The value of $q^+(a)$ is a boundary of a different parameter applicable to the regions of q. We shall define these regions as follows:

$$\begin{aligned}
&S_1: & q^+(2) &= (2D-3)D^n/3 & &< q \leq D^n(D-1) \\
&S_2: & q^+(3) &= (2D-5)D^n/5 & &< q \leq q^+(2) = (2D-3)D^n/3 \\
&S_3: & q^+(4) &= (2D-7)D^n/7 & &< q \leq q^+(3) = (2D-5)D^n/5 \\
&\vdots \\
&S_i: & q^+(i+1) &= (2D-2i-1)D^n/(2i+1) & &< q \leq q^+(i) = (2D-2i+1)D^n/(2i-1) \\
&\vdots \\
&S_{D-3}: & q^+(D-2) &= 5D^n/(2D-5) & &< q \leq q^+(D-3) = 7D^n/(2D-7) \\
&S_{D-2}: & q^+(D-1) &= 3D^n/(2D-3) & &< q \leq q^+(D-2) = 5D^n/(2D-5) \\
&S_{D-1}: & q^+(D) &= D^n/(2D-1) & &< q \leq q^+(D-1) = 3D^n/(2D-3) \\
&S_D: & 0 & & &< q \leq q^+(D) = D^n/(2D-1)
\end{aligned} \quad (6)$$

We shall call the regions subdivisions of q that are depicted as $S_i$ for $i = 1, 2, 3, \ldots, D-1, D$ in FIG. 1.

Next, we observe the following situation: although $|g(q,a+1)|$ is greater than $|g(q,a)|$ for any q in $S_a$ (refer FIG. 1) but $q_2/D^n$ is less than $q_1/D^n$ where the value of $q_2$ is computed from $q_2 = -g(q_1,a+1)D^n$. Thus, the value of $q_2$ may belong to another subdivision $S_i$ where $i \geq a$ and $q_1$ is assumed in $S_a$. The function $-g(q,a+1)D^n$ shall be denoted as $q_2 = h(q_1,a)$. The entire computed mapping range of h(q,a) from the $q_1$ domain $0 \leq q \leq D^n(D-1)$ is the interval of $0 \leq q \leq D^{n+1}$. The individual subranges $R_a$ of $h(q_1,a)$ for each corresponding domain $S_a$ for $a = 1, 2, 3, \ldots, (D-1)$ are computed as follows:

$$\begin{aligned}
&R_1: & D^{n+1}/3 &< h(q^{\pm}(2),2) & &\leq q_2 \leq h(D^n(D-1),2) = D^{n+1} \\
&R_2: & D^{n+1}/5 &< h(q^{\pm}(3),3) & &\leq q_2 \leq h(q^+(2),3) = D^{n+1} \\
&R_3: & D^{n+1}/7 &< h(q^{\pm}(4),4) & &\leq q_2 \leq h(q^+(3),4) = 3D^{n+1}/5 \\
&\vdots \\
&R_i: & D^{n+1}/(2i+1) &< h(q^{\pm}(i+1),i+1) & &\leq q_2 \leq h(q^+(i),i+1) = 3D^{n+1}/(2i-1) \\
&\vdots \\
&R_{D-3}: & D^{n+1}/(2D-5) &< h(q^{\pm}(D-2),D-2) & &\leq q_2 \leq h(q^+(D-3),D-2) = 3D^{n+1}/(2D-7) \\
&R_{D-2}: & D^{n+1}/(2D-3) &< h(q^{\pm}(D-1),D-1) & &\leq q_2 \leq h(q^+(D-2),D-1) = 3D^{n+1}/(2D-5) \\
&R_{D-1}: & D^{n+1}/(2D-1) &< h(q^{\pm}(D),D) & &\leq q_2 \leq h(q^+(D-1),D) = 3D^{n+1}/(2D-3)
\end{aligned} \quad (7)$$

where $q^{\pm}(a)$ for $a = 2, 3, \ldots, D$ is the inferior limit of $q^+(a)$ in $S_a$.

Figure 2:
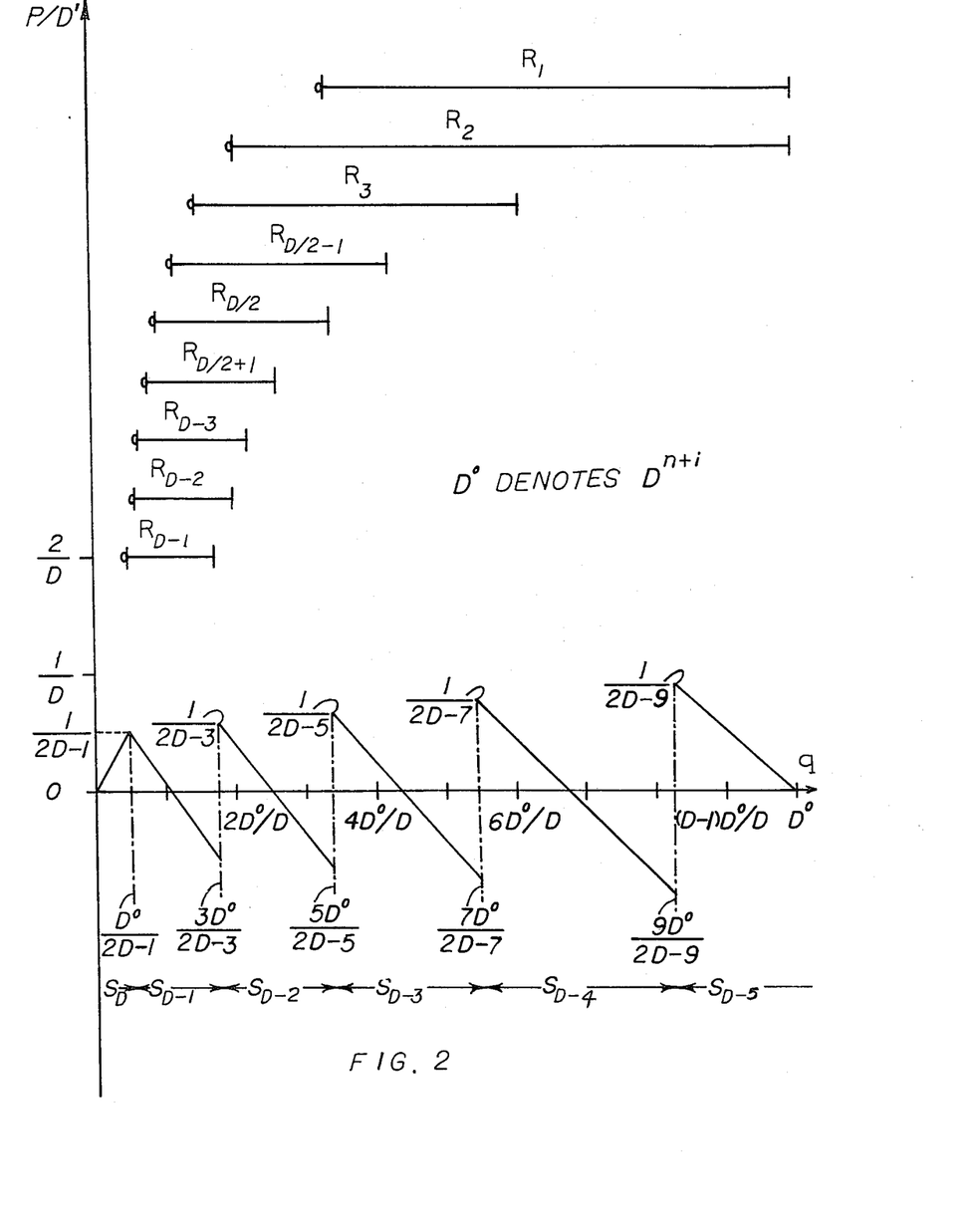
FIG. 2 shows a functional relationship between the domain and the range of the mathematical functions and also shows a successive application process of the determining acceleration constants.

FIG. 2 illustrates the subranges $R_a$ and the detailed $f_1(a)$ and $g(q,a)$ and also shows subdivisions $S_1$ for $i = D-5, D-4, \ldots, D$.

In order to apply functions $h(q,a)$ and $g(q,a)$ recursively we will use the suffix n. Thus $h(q,a)$ and $g(q,a)$ become $h_n(q,a)$ and $g_n(q,a)$, respectively. The q domain becomes the interval $0 \leq q \leq D^n(D-1)$ for n, and for $n+1$ the q domain becomes the interval $0 \leq q \leq D^{n+1}(D-1)$. Similarly for applying $S_a$ recursively we use $S^n_a$ with the q domain above.

The mapping function $h_{n+i}(q_i, a_i)$ is a piece-wise linear function that maps the interval of q, or $0 \leq q \leq D^{n+i}(D-1)$, into the interval $0 \leq q \leq D^{n+i+1}$. When the pseudoradices $D^{n+i}$ and $D^{n+i+1}$ are neglected due to the relative definition of the subdivisions with respect to them, these intervals (the individual subranges described in (7) and each corresponding subdivisions defined in (6)) may be considered fixed upper/lower limits relative to a pseudoradix and are called relative ranges and relative domains of q, respectively. An interval consisting of the upper/lower limits of each subdivision is greater than the one of the corresponding subrange limits except the case $a = D-1$. In other words, a mapped relative range, which becomes the next relative domain, is narrower than its relative domain. When a successive application of $h(q,a)$ is taking place, a distance measured from the origin in the relative q coordinate is contracting until the distance reaches the subdivision $S_{D-a}$ that is an invariant interval. The gradually shrinking distances are successive images of the q mapping. Thus, there is a sequence of subdivisions that are a visiting order of successive images.

Let $B = D^n + q_0$ be a constant of a divisor. If a successive $q_i$ is determined by $q_{i+1} = h_{n+i}(q_i, a_i)$ where $q_i$ in $S_{a_i}^{n+i}$ for $i = 0, 1, 2, 3, \ldots$, then parameters $a_0, a_1, a_2, \ldots$, and $a_j$ in generating a sequence by $h(q,a)$ have a relation:

$$a_0 \leq a_1 \leq a_2 \leq \ldots \leq a_j = D-1$$

where $q_j$ is in $S_{D-1}^{n+j}$. FIG. 2 illustrates these successive images of $q_0$. For example if the initial $q_0$ is in $S_1$ then the mapped image $q_1 = h(q_0, 1)$ exists in $R_1$. Since the subrange $R_1$ is equal to the summed subdivisions of $S_{D-3}, S_{D-4}$, and the left part of $S_{D-5}$, the value of q exists in the summed subdivision. Let us assume it in $S_{D-3}$. FIG. 2 depicts that $R_1$ is overlapped on the summed subdivision. By applying another mapping on $q_1$, the image of $q_1$, $q_2 = h(q_1, D-3)$, shall belong to the subrange $R_{D-3}$ that is also overlapped on parts of $S_{D-1}$ and $S_{D-2}$ (refer FIG. 2).

A repeated application of the mapping to a value q will result in the movement of successive images into the subdivision $S_{D-1}$. As soon as the last image $q_j$ that belongs to $S_{D-1}$ is obtained, the function $g(q_j, D-1)$ is evaluated, in order to find the final ratio $q_f$. Let $q_0$ be in the domain $0 \leq q_0 \leq D^n(D-1)$. If $q_0$ is in a subdivision $S_{a_0}$ where an integer $a_0$ is in the interval $1 \leq a_0 \leq D-1$ and the last $q_j$ which is the first visit in the subdivision $S_{D-1}$ is obtained through a sequence of $q_i$ by successive mapping $q_{i+1} = h_{n+i}(q_i, a_i)$, then an acceleration factor $\alpha'$ is $$\alpha' = (D-1) \prod_{i=0}^{j-1} (a_i + 1)$$

The final ratio $P/D'$ is obtained from $q_f = -g_{n+j}(q_j, q_j, D-1)$, so we have $$1/B = \alpha'\{1 - q_f + q_f^2 - q_f^3 + q_f^4 - \ldots\}/D^{n+j+1} \qquad (8)$$

where $|q_f| \leq 1/(2D-3)$ is guaranteed, since $1/(2D-3)$ is derived by substituting equation (5) into the function $g(q,a)$ and by setting $a = D-1$ in the substituted result. When the initial $q_0$ exists in $S_D$ that is the remaining case to discuss, the final $q_f$ is determined from $q_f = f_1(q_0)$. An acceleration factor for this case is D in equation (8), where $|q_f| \leq 1/(2D-1)$ by substituting $a = D$ in (5).

After we obtained a ratio $q_f$ from the above method, the quantity of (8) must be evaluated. However, a careful inspection of the inside terms in the brace of (8) leads us to the following factorial terms:

$$1 - q + q^2 - q^3 + q^4 - q^5 + q^6 - q^7 + q^8 - q^9 + q^{10} - \ldots$$
$$= 1 - q + q^2(1-q) + q^4(1 - q + q^2 - q^3) +$$
$$q^8(1 - q + q^2 - q^3 + q^4 - \ldots - q^7) + q^{16}(1 - q + q^2 \ldots$$
$$= (1-q)(1+q^2) + q^4\{(1-q)(1+q^2)\} +$$
$$q^8\{(1-q)(1+q^2) + q^4(1-q)(1+q^2)\} + q^{16} \ldots$$
$$= (1-q)(1+q^2)(1+q^4)(1+q^8)(1+q^{16}) \ldots$$

We consider these terms as other acceleration factors and denote them as follows:

$$b_0 = D(1-q_f) \qquad (9\text{-a})$$

$$b_k = D(1+q_f^{2^k}) \text{ for } k = 1,2,3,\ldots \qquad (9\text{-b})$$

Thus, equation (8) becomes $$1/B = \alpha' \prod_{k=0}^{l} b_k \{1 + q_f^{2^{l+1}} - (q_f^{2^{l+1}})^2 + \ldots\}/D^{n+j+l+2} \qquad (10)$$

Ignoring the terms that are smaller than $q_f^{2^l}$ in (10), an approximated reciprocal of B becomes as follows:

$$1/B = \alpha' \prod_{k=0}^{l} b_k/D^{n+j+l+2} = \alpha/D^{n+j+l+2}. \qquad (11)$$

Figure 3:
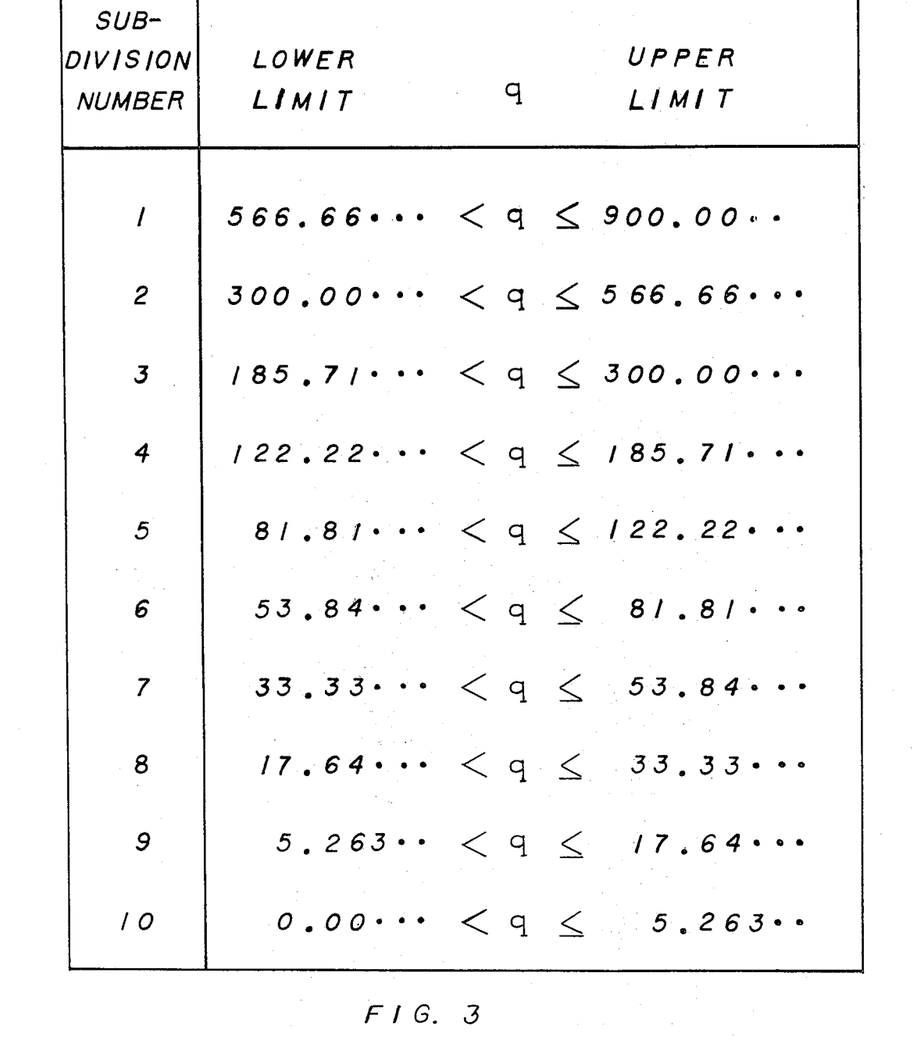
FIG. 3 is a table of subdivisions described herein.

FIG. 3 is a subdivision table for the base radix = 10 and the pseudoradix = 100. It is computed from equation (6). The following examples shall utilize the table for the successive mapping of q.

Figure 4:
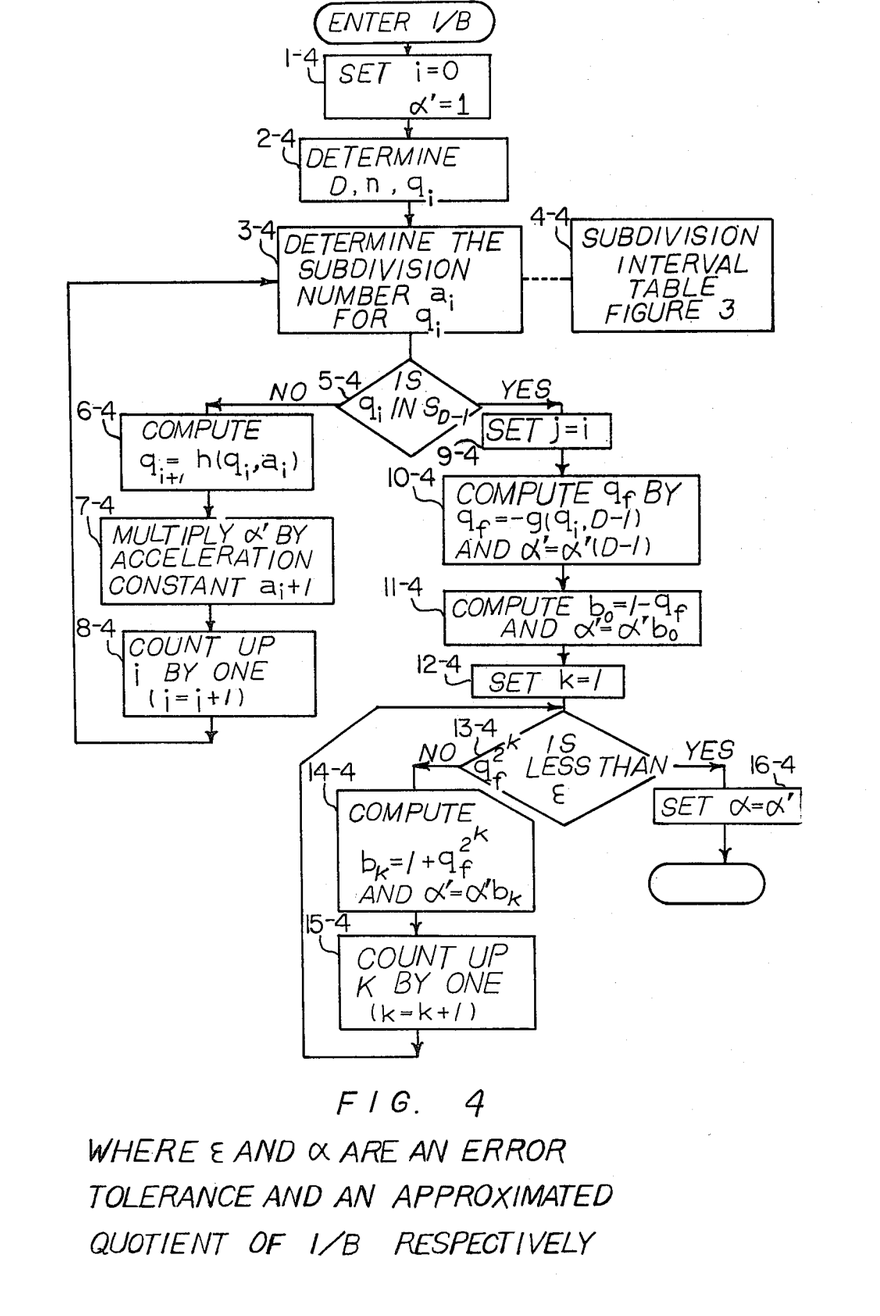
FIG. 4 is a block diagram chart showing steps to perform division 1/B based on the invention.

The following steps illustrate a computation of 1/189 through the division process described in the block diagram of FIG. 4.

Example 1; starting B = 189 with a base radix D = 10,

| | |
|---|---|
| in box 1-4 | $i = 0$ and the initial $\alpha' = 1$ |
| in box 2-4 | $D = 10$, $n = 2$, and $q_o = 89$ ($D^2 = 100$) |
| in box 3-4 | $a_o = 5$ |
| in box 5-4 | $q_o$ is in $S_5$ so it is not in $S_{D-1}(=S_9)$ |
| in box 6-4 | $q_1 = h_{n+i}(q_o, a_o) = h_2(89,5) = 13.4$ |
| in box 7-4 | $\alpha' = \alpha'(a_o + 1) = 1 \cdot 6$ |
| in box 8-4 | $i = i + 1 = 0 + 1 = 1$ |
| in box 3-4 | $a_1 = D - 1(=9)$ |
| in box 5-4 | $q_1$ is in $S_{D-1} = S_9$. |
| in box 9-4 | $j = i = 1$ |
| in box 10-4 | $q_f = -g(q_1, 9) = 0.0206$ and |
| | $\alpha' = \alpha'(D-1) = 6 \cdot 9 = 54$ |
| in box 11-4 | $b_o = 1 - q_f = 1 - 0.0206 = 0.9794$ and |

-continued

| | |
|---|---|
| | $a' = a'b_o = 54 \cdot 0.9794$ |
| in box 12-4 | $k = 1$ |
| in box 13-4 | is $(0.0206)^2$ less than $\epsilon$? "no" |
| in box 14-4 | $b_1 = 1 + 0.0206^2 = 1.00042436$ and |
| | $a' = a'b_1 = 54 \cdot 0.9794 \cdot 1.00042436$ |
| in box 15-4 | $k = k + 1 = 1 + 1 = 2$ |
| in box 13-4 | is $(0.0206)^4$ less than $\epsilon$? "no" |
| in box 14-4 | $b_2 = 1 + 0.0206^4 = 1.000000180081$ and |
| | $a' = a'b_2 = 54 \cdot 0.9794 \cdot 1.00042436 \cdot 1.000000180081$ |
| in box 13-4 | is $(0.0206)^8$ less than $\epsilon$? "yes" |
| in box 16-4 | the approximated quotient is |
| | $\alpha = 0.00529100529100295\ldots$ where $\alpha = a'$ | where $\epsilon = 1.0 \times 10^{-14}$ is assumed.

Example 2; the same divisor is used but a different base radix $D = 100$ is employed.

| | |
|---|---|
| in box 1-4 | $i = 0$ and $a' = 1$ |
| in box 2-4 | $D = 100$, $n = 1$, and $q_o = 89$ ($D^1 = 100$) |
| in box 3-4 | $a_o = 53$ where the upper/lower limit of $S_{53}$ is $86.91\ldots < q \leq 90.47\ldots$ |
| in box 5-4 | $q_o$ is not in $S_{D-1}(=S_{99})$ but in $S_{53}$ |
| in box 6-4 | $q_1 = h_{n+1}(q_o, a_o) = h_1(89,53) = 2.06$ |
| in box 7-4 | $a' = a'(a_o + 1) = 1 \cdot 54 = 54$ |
| in box 8-4 | $i = i + 1 = 0 + 1 = 1$ |
| in box 3-4 | $a_1 = 98$ where the upper/lower limit of $S_{98}$ is $1.522\ldots < q \leq 2.564\ldots$ |
| in box 5-4 | $q_1$ is not in $S_{D-1}$ but in $S_{98}$ |
| in box 6-4 | $q_2 = h_{n+1}(q_1, a_1) = h_2(2.06, 98) = 1.0394$ |
| in box 7-4 | $a' = a'(a_1 + 1) = 54 \cdot 99$ |
| in box 8-4 | $i = i + 1 = 1 + 1 = 2$ |
| in box 3-4 | $q_2$ is in $S_{99}$ now where the upper/lower limit of $S_{99}$ is $0.0502\ldots < q \leq 1.522\ldots$ and $a_2 = 99$ |
| in box 5-4 | $q_2$ is in $S_{D-1}$ |
| in box 9-4 | $j = i = 2$ |
| in box 10-4 | $q_f = -g(q_2, a_2) = -g(1.0394, 99) = 0.00029006$ and $a' = a'(D - 1) = 54 \cdot 99 \cdot 99$ |
| in box 11-4 | $b_o = 1 - q_f = 0.99970994$ and $a' = a'b_o = 54 \cdot 99 \cdot 99 \, 0.99970994$ |
| in box 12-4 | $k = 1$ |
| in box 13-4 | is $(0.00029006)^2$ less than $\epsilon$? "no" |
| in box 14-4 | $b_1 = 1 + 0.00029006^2 = 1.000000084138036$ and $a' = a'b_1 = 54 \cdot 99 \cdot 99 \cdot 0.99970994 \cdot 1.000000084138036$ |
| in box 15-4 | $k = k + 1 = 1 + 1 = 2$ |
| in box 13-4 | is $(0.00029006)^4$ less than $\epsilon$? "yes" |
| in box 16-4 | the approximated quotient is $\alpha = 0.005291005291005243\ldots$ where $\alpha = a'$ |

Comparing these results with the real quotient $0.00529100529100529100\ldots$, we find that these numerical accuracies are correct to 12 digits (when $D = 10$) and to 14 digits (when $D = 100$). In the example we needed to evaluate acceleration constants of two a's (one integer multiplication, note: (D-1) multiplication is performed with a shift to the left and a subtraction) the three b's (twice of squaring operations) for the case $D = 10$, and three a's (twice of integer multiplications) and two b's (once of squaring operation) for the case $D = 100$. Also it was necessary to perform five subtractions in each case and to multiply these constants by each other (four multiplications) in order to obtain the numerical quotient.

Consider a straightforward application of the equation (9), that is quadratic convergence, to this example. We would probably need to determine nine b's starting with $b_o = 10 \cdot (1 - 89/100) = 1.1$ in order to attain at least the same accuracy. This implies that eight squaring operations, nine multiplications, and nine subtractions must be computed. Also consider the well known method used in the IBM System 360/91 Model. The method requires nine multiplications and four subtractions in this example. A comparison table is presented below where M and S denote multiplication (or squaring operation) and subtraction, respectively.

| Type of Operation | M | S |
|---|---|---|
| Well known method | 9 | 4 |
| Quadratic convergence method | 17 | 9 |
| Invented process for the case $D = 10$ | 7 | 5 |
| Invented process for the case $D = 100$ | 7 | 5 |

The calculation of a numerical inverse using the acceleration factor compares very well with the quadratic convergence method and the well known method.

When a divisor consists of many digits, the divisor can be split in two (or more) separated digit strings. Consider $B = B_1 D^m + B_2$ where $B_1$ and $B_2$ are the upper half significant digits and the lower half significant digits, respectively and $D^m$ is a pseudoradix that indicates the splitting digit boundary between $B_1$ and $B_2$. Thus, we have the following equation:

$$1/B = (1/B_1 D^m)(1/(1 + q_b)) = \qquad (12)$$

$$a' \left\{ \prod_{k=0}^{\infty} (b_k/D) \prod_{r=0}^{\infty} c_r/D^m \right\} / D^{n+j+2}$$

where $q_b = B_2/B_1 D^m$, and $c_o = 1 - q_b$ and $c_r = 1 + q_b^{24}$ or $r = 1, 2, 3, \cdots$. The second product term in the brace is the power series equivalent to $1/(1+q_b)$ and the rest of the terms are a computation of $1/B_1$ which is the equation (10).

Figure 5A:
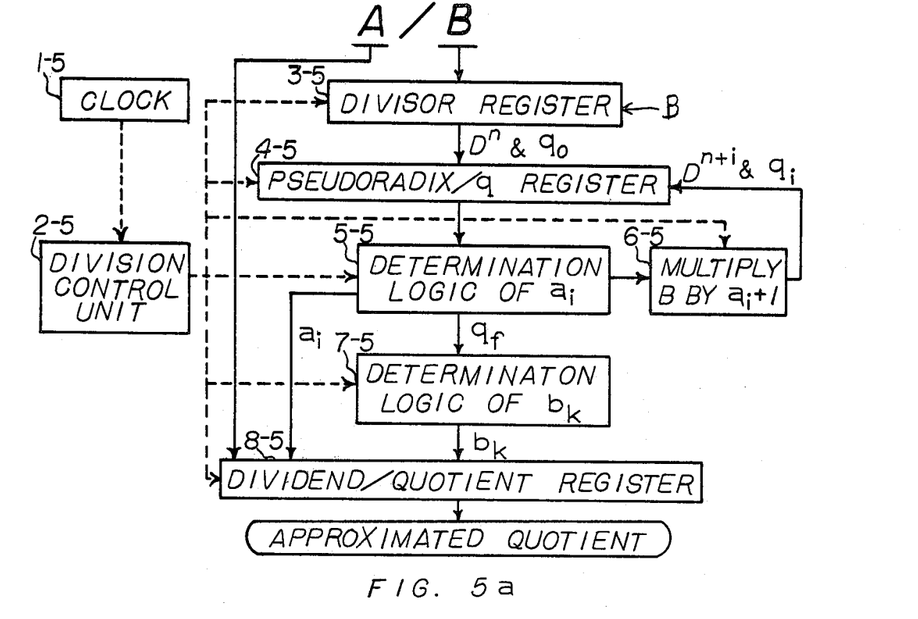
FIGS. 5a and 5b are block diagrams indicating a system of conventional electronic digital equipment for performing the division described herein.

FIG. 5-a illustrates a digital circuitry diagram. Blocks 1-5 and 2-5 are sequential control units to perform a digital division (or to obtain a reciprocal of a constant). Dividend and divisor are stored in digital registers of blocks 8-5 and 3-5, respectively. Block 4-5 is a register holding a pseudoradix $D^n$ and the quantity q. The register of block 4-5 is used recursively during the determination process of acceleration constants $a_i$ for $i = 0, 1, 2, \ldots, j$. Block 5-5 is the determination logic circuitry of $a_i$ that utilizes the subdivision table. The subdivision table could be realized by using Read Only Memory. After determining an appropriate acceleration constant by block 5-5, B is multiplied by the constant in order to obtain the next q at block 6-5. Simultaneously the constant is sent to the register of block 8-5 in order to multiply A by it. The results (the next q and the next pseudoradix) from block 6-5 are sent back to the register of block 4-5. The determination logic of block 5-5 is activated again for the content of the register block 4-5.

The functions of blocks 4-5, 5-5 and 6-5 have been charted in the process boxes 3-5, 5-4, 6-4, 7-4, 8-4, 3-4, 5-4, ... of FIG. 4 recursively, until a successive q value belongs in the subdivision $S_{D-1}$. When the q is in $S_{D-1}$, block 7-5 is initiating the functions that are described by process boxes 9-4 through 15-4 in FIG. 4. These processes are the evaluation of the power series of $1/(1+q_j)$. The constant $b_i$ determined in this block is transmitted to the register of block 8-5, in order to multiply A by it. When a desired accuracy of the quotient is accumulated in the register of block 8-5, the control unit signals the termination of operations to all the blocks.

Figure 5B:
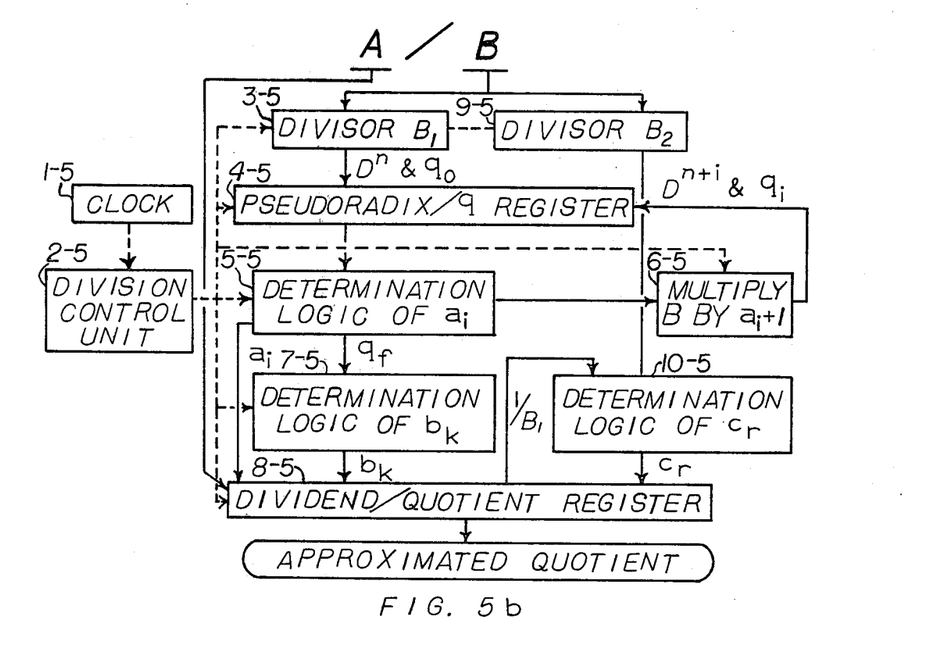

When divisor digits are split in two subdivisors (refer equation (12)), the computation process of the power series of $1/(1+q_b)$ must be continued after completing an evaluation of $1/B_1$. A digital circuitry diagram of the digit splitting case is illustrated in FIG. 5-b. The functions of the first eight blocks are the same as these eight blocks of FIG. 5-a except the divisor B is split in two $B_1$ and $B_2$ subdivisors. Another difference is the eight blocks worked for $1/B_1$ instead of $1/B$. Registers of blocks 3-5 and 9-5 hold the upper half significant digits and the lower half significant digits of B, respectively. As soon as desired accurate digits of $1/B_1$ are obtained in the register of block 8-5, the control unit commands the computation of $1/(1+q_b)$ at block 10-5 that is generating constants of $c_r$ for $r=0,1,2,\ldots$. Each generated constant $c_r$ is sent to the register of block 8-5 to multiply A by it.

The control unit terminates the process when a desired accuracy is accumulated in the register holding A. Since the performance of block 10 is the same as the function of block 7, both the block functions could be realized with a physical digital circuitry.

Figure 6:
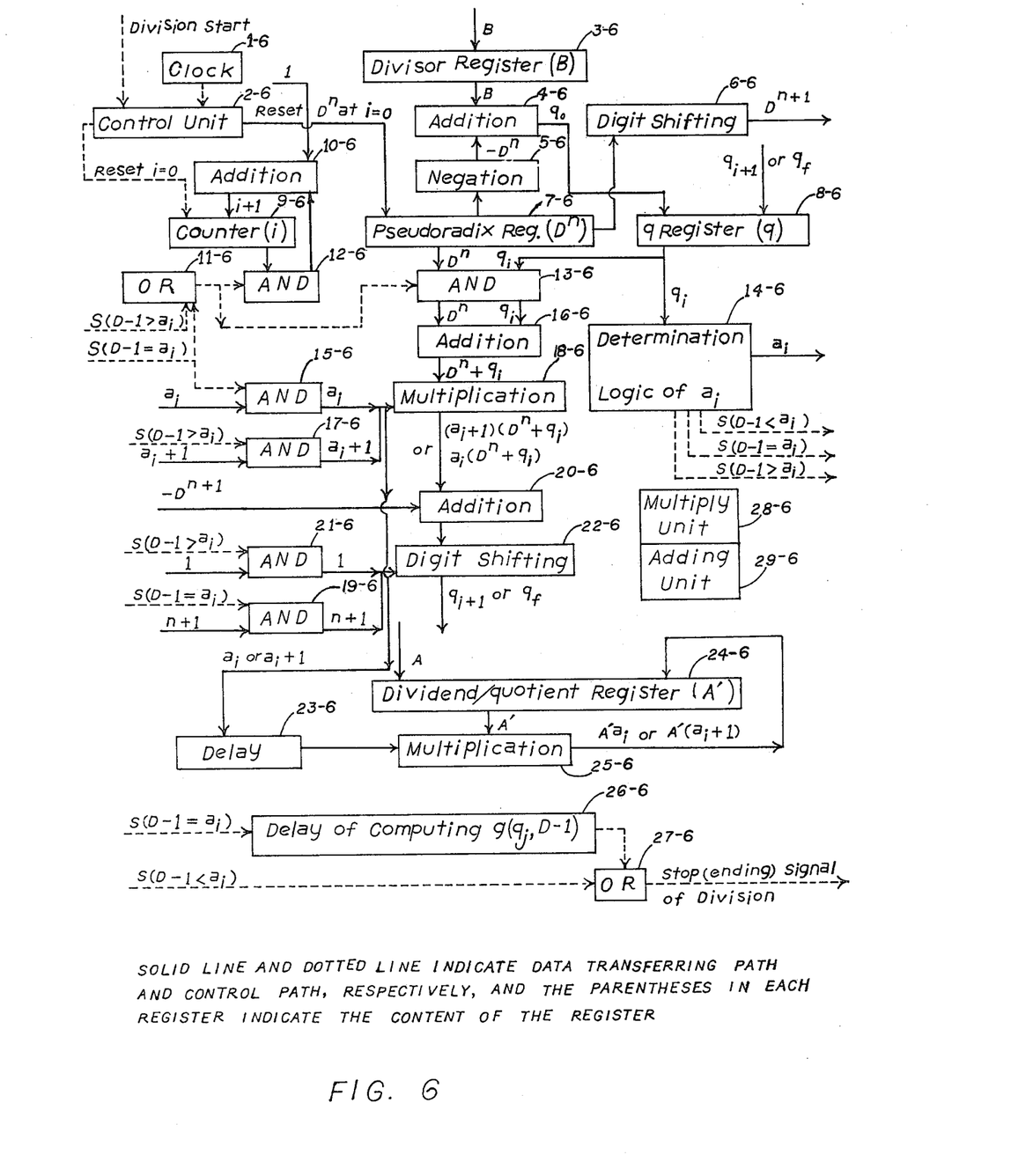
FIG. 6 is an operational block diagram indicating a performing logic of the successive multiplication of a multiplier to a dividend A and a divisor B.
Figure 7:
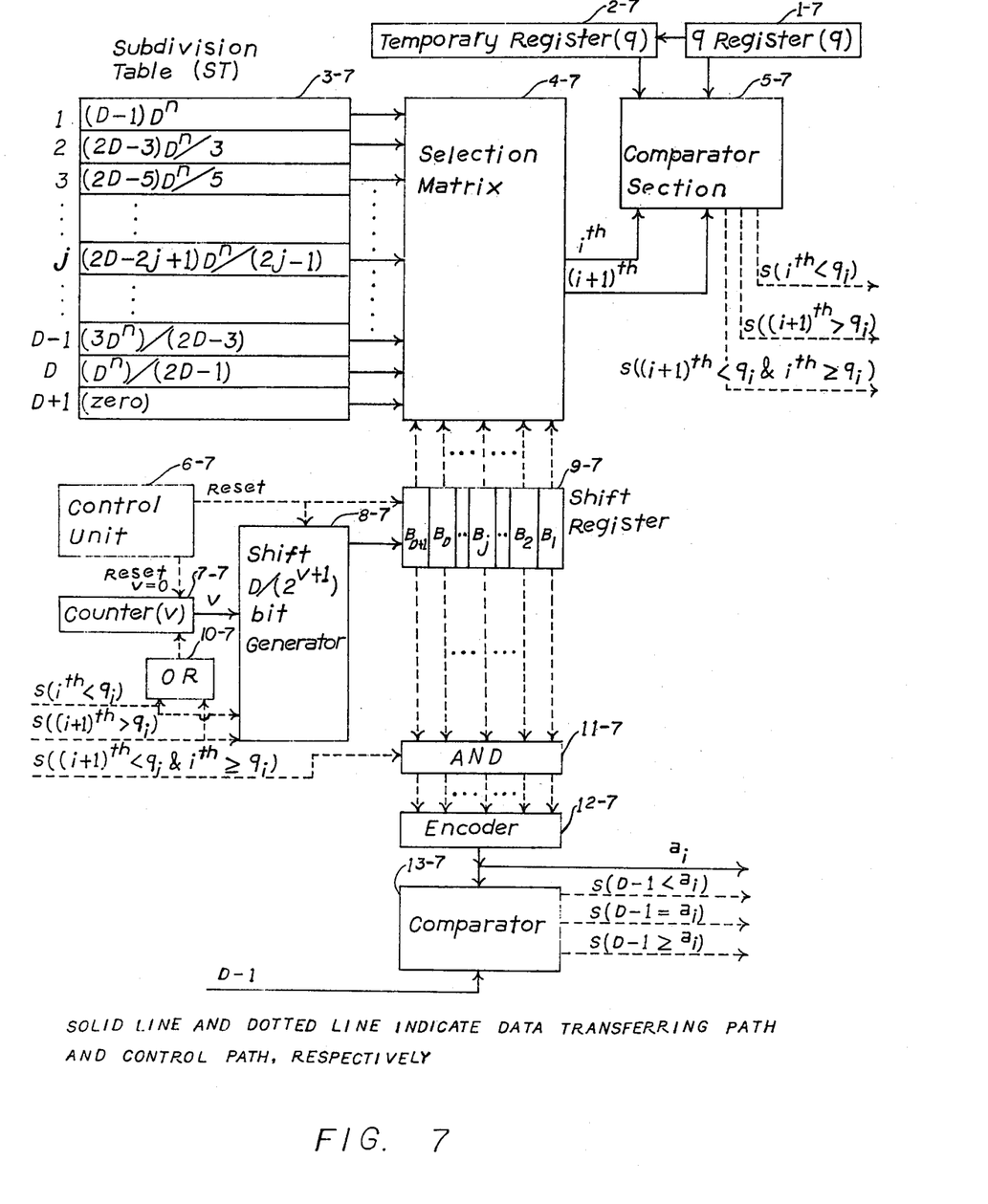
FIG. 7 is an operational block diagram depicting a determination of an acceleration constant.
Figure 8:
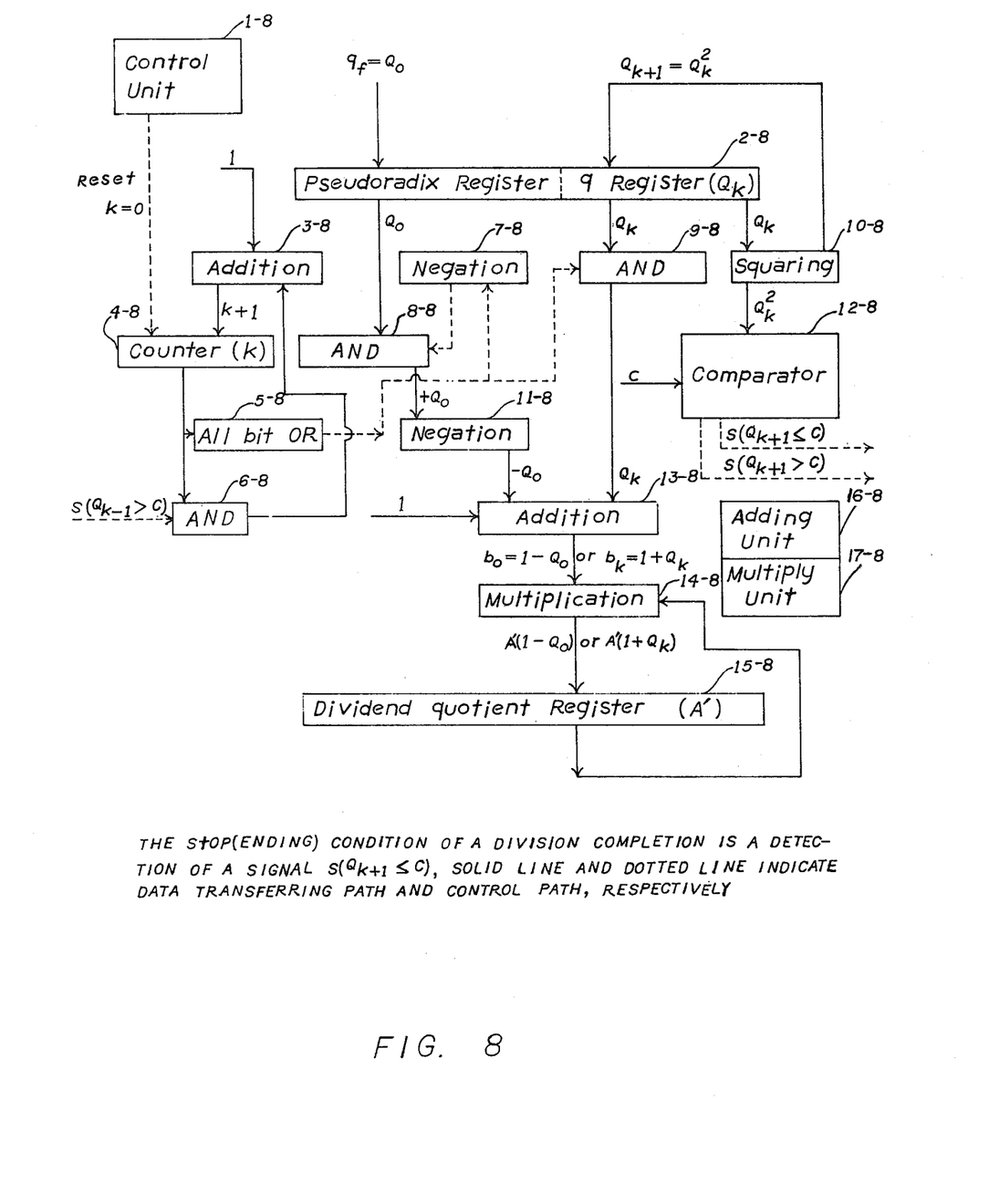
FIG. 8 is an operational block diagram illustrating an evaluation process of the power series.

The other aspect of the performing division is illustrated in FIGS. 6, 7, and 8. FIG. 6 shows the successive multiplication to the dividend by acceleration constants and the iterative determination of the quantity of $q_i$ for $i=0,1,2,\cdots$. When the control unit 1, comprising sequential circuitry, has received a division start signal after storing dividend A and divisor B into the dividend/quotient register 24, comprising a row of associated flipflops, and the divisor register 3, comprising another row of associated flipflops, respectively, the control unit resets the pseudoradix register 7 and the i counter 9, structuring circuitry with feedback loops depended not only on its present input but also on the inputs that may have been presented previously, with a predetermined pseudoradix $D^n$ and zeros, respectively. Then the control unit commands the negation logic 5 to get $-D^n$ and starts the addition 4 to obtain q from B and $-D^n$ by a digital adding circuitry 29. The resultant $q_o$ is stored in the q register 8. Next, the control unit initiates the determination logic of $a_i$ 14, comprising combinational logic circuits and Read Only Memories (ROM) of a table, that provides a control signal, $s(D-1<a_i)$, $s(D-1=a_i)$ or $s(D-1<a_i)$, and an acceleration constant $a_i$ as the output from this.

If a signal $s(D-1>a_i)$ is generated, then the signal is used to start i counter counting by performing the addition 10 through the OR logic 11 and the AND logic 12. Furthermore, if it is, the signal opens a control path of the OR logic 11 and the AND logic 13 to form the quantity $D^n+q_i$ by the addition 16. Then the signal $s(D-1>a_i)$ also provides a path for a multiplication $(a_i+1)$ to the multiplicant $(D^n+q_i)$ via the AND logic 17. After a completion of the above, the multiplication 18 furnishes the result $(a_i+1)(D^n+q_i)$ by a digital multiplier 28. The shifted by one digit in block 6 and negated result $-D^{n+1}$ of $D^n$ and the resulted quantity $(a_i+1)(D^n+q_i)$ of the multiplication are added by the addition 20. When the digit shifting 22 is performed by one digit via the actuated commanding signal controlled by the AND logic 21 when detecting the signal $s(D-1>a_i)$. The consequent result $q_{i+1}$ is fed back in the q register 8. Subsequently the control unit initiates the determination logic of $a_i$ 14 again to determine another control signal and another $a_i$.

If a signal $s(D-1=a_i)$ is generated by the determination logic of $a_i$ 14 then the signal is used to actuate that the i counter is counted up by performing the addition 10 through a signal path of the OR logic 11 and the AND logic 12. Furthermore, the signal opens the OR logic 11 and the AND logic 13 in order to form the quantity $(D^n+q_i)$ by the addition 16. Then the signal $s(D-1=a_i)$ also provides the path for a multiplication $a_i=D-1$ to the multiplicant $(D^n+q_i)$ via the AND logic 15. After a completion of these operations, the multiplication 18 provides the result $a_i(D^n+q_i)=(D-1)(D^n+q_i)$ by one digit shifting of the multiplicant and by subtracting the multiplicant from the shifted result. Also the shifted by one digit in block 6 and negated result $-D^{n+1}$ of $D^n$ and the resulted quantity $a_i(D^n+q_i)$ of the multiplication are added by the addition 20. Then the digit shifting 22 is carried out by (n+1) digits via the actuated command signal by detecting the signal $s(D-1=a_i)$ in the AND logic 19. The consequent result $q_f$ is fed back in the q register 8. Subsequently the control unit shall receive the stop condition signal of the iterative process for $q_i$ evaluation through the delay logic 26 and the OR logic 27 by passing the signal $s(D-1=a_i)$.

Concurrently, the multiplier $(a_i+1)$ or $a_i$, when a generated signal is $s(D-1>a_i)$ or $s(D-1=a_i)$ respectively by the determination logic of $a_i$, is multiplied to the content A' of the dividend/quotient register 24 by the multiplication 25. Note that when a multiplier is a digit number $D-1$, the multiplication of the multiplicant $(D^n+q_i)$ by the multiplier is performed by one digit shifting of the multiplicant and by subtracting the multiplicant from the shifted result. The result, $A'(a_i+1)$ or $A'a_i$, of the multiplication is stored back into the dividend/quotient register. The delay logic 23 provides a time delay so that a digital multiplier can perform both the multiplications 18 and 25.

If the generated signal from the determination logic of $a_i$ 14 is a signal $s(D-1>a_i)$ then the iterative process for $q_i$ evaluation shall not be initiated due to detecting the stop condition signal from the OR logic 27. Intermediate results of additions 16 and 20, multiplication 18 and digit shifting 22 could be held in the divisor register 3, in the q register 8 or in the combined register of both the registers 3 and 8.

FIG. 7 depicts an internal logic of the determination logic of $a_i$ which consists of a subdivision table 3-7 comprising a set of memory registers; a selection matrix 4-7 comprising a set of AND logics; a comparator section 5-7 comprising one or more comparators structured to compare the content $q_i$ of the q register with the $i^{th}$ content and the $(i+1)^{th}$ content of the subdivision table and to generate an output signal indicating a magnitude relationship between the $q_i$, and the $i^{th}$ content and/or the $(i+1)^{th}$ content such as $s(i^{th}\text{ content}<q_i)$, $s((i+1)^{th}\text{ content}>q_i)$ or $s((i+1)^{th}\text{ content}>q_i$ and $i^{th}\text{ content}\geq q_i)$; a digital counter 7-7 structured to count up the content whenever an ORed signal from the OR logic 10-7 of the signals, $s(i^{th}\text{ content}<q_i)$ and $s((i+1)^{th}\text{ content}>q_i)$, appears; a shift register 9-7 comprised of a chain of flipflops to provide two selection bits for the selection matrix; a shift bit generator 8-7, comprised of sequential circuitry structuring to generate a train of pulse wave forms dictating a number of shifting bits $D/(2^{\nu+1})$ where $\nu$ is the content of the counter 7-7 and a signal directing shifts to the right or to the left depended on a signal, $s(i^{th}\text{ content}<q_i)$ or $s((i+1)^{th}\text{ content}>q_i)$; an encoder 12-7 which performs convertion of the present selecting bit position in the shift register to an acceleration constant $a_i$ when a signal $s((i+1)^{th}\text{ content}<q_i$ and $i^{th}\text{ content}\geq q_i)$ is generated by the comparator section 5-7; and a comparator 13-7 that generates a signal indicated a magnitude relationship between the acceleration constant $a_i$ and the digital constant $D-1$, where D is a base radix by a comparator 13-7.

The control unit 6-7 initializes the shift register to select the $(D/2)^{th}$ content and the $(D/2+1)^{th}$ content of the subdivision table, and the counter through reset lines when a division has started. Then the shift register bits open data paths of the designated contents of the table to the comparator section via the selection matrix. The comparator section generates a signal, that indicates a magnitude relationship between the quantity $q_i$ and the designated contents, such as $s(i^{th}$ content$<q_i)$, $s((i+1)^{th}$ content$>q_i)$ or $s((i+1)^{th}$ content$<q_i$ and $i^{th}$ content$\geq q_i)$.

When a signal $s(i^{th}$ content$<q_i)$ or $s((i+1)^{th}$ content$>q_i)$ is generated, the counter is counted up by one via a signal from the OR logic 10-7. Also the generated signal is used in the shift bit generator to determine a shifting direction. Then the shift bit generator generates a train of pulses synchronized with clock pulses in order to dictate a number of shifting bits, $(D/2^{\nu+1})$, in the shifting register. The shifted content of the shift register makes transferring paths of the new designated contents to the comparator section via appropriate AND logics of the selection matrix.

When a signal $s((i+1)^{th}$ content$<q_i$ and $i^{th}$ content$\geq q_i)$ is generated, the bit position of the shift register is encoded to an acceleration constant $a_i$ by opening the AND logic 11-7. Finally a comparator generates a magnitude relationship signal between the $a_i$ and the constant $D-1$, such as $s(D-1<a_i)$; $s(D-1=a_i)$ or $s(D-1>a_i)$.

FIG. 8 illustrates the evaluation process of the power series after the quantities $q_f$ and $A'=A\alpha'=A(a_0+1)\ldots(a_{j-1}+1)(D-1)$ have been obtained in the pseudoradix/q register 2-8 and the dividend/quotient register 15-8, respectively. All combined blocks in FIG. 8 except the above two registers and the control unit 1-8 provides the function of the determination logic of $b_k$ in figure 5-8. The control unit arranges a combination of the pseudoradix register and the q register and initializes the k counter 4-8, structuring circuitry with feedback loops, with all zero bits. By the OR logic 5-8, all bits of the k counter are ORed. Since the initial output of the OR logic 5-8 is a zero, the AND logic 8-8, is opened for transferring the present content $Q_o=q_f$ of the pseudoradix/q register by the negated signal by the negation 7-8. The quantity $Q_o$ is negated by the negation logic 11-8 then the addition 13-8 by utilizing the adding unit 16-8 is performed to produce the quantity $1-Q_o$. The content $A'$ of the dividend/quotient register is multiplied by $1-Q_o$ by utilizing the multiply unit 17-8 and the result is stored back in the dividend/quotient register.

Simultaneously, the control unit actuates the squaring operation by performing the multiplication 10 by using the multiply unit 17-8 in order to form $Q_k^2=Q_{k+1}$ then the squaring result is stored back in the pseudoradix/q register. At the same time the quantity $Q_{k+1}$ is compared with a predetermined truncation error tolerance C, in general the C is less than the least significant digit (bit) of the divisor, by the comparator 12-8 comprising combinational logic circuitry. The comparator outputs a signal, $s(Q_{k+1}\leq C)$ or $s(Q_{k+1}>C)$.

If the signal $s(Q_{k+1}>C)$ is generated then the k counter is counted up by one via the AND logic 6-8 and the addition 3-8. After a count up of the k counter, all bits of the k counter are ORed. The ORed signal opens the AND logic 9-8 then the addition 13-8 is performed to form the quantity $1+Q_k$. After the addition, the multiplication 14-8 is executed in order to produce a new quantity $A'\cdot(1+Q_k)$ as a new content of the dividend/quotient register. Beside the operations of the addition 13-8 and the multiplication 14-8, the squaring operation 10-8 and the comparison by the comparator 12-8 are carried out parallelly. When the signal $s(Q_{k+1}>C)$ is generated again, the same process of the addition 13-8 and the multiplication 14-8, and the squaring 10-8 and the comparison by the comparator 12-8 is repeated until a signal $s(Q_{k+1}\leq C)$ is generated by the comparator. When a signal $s(Q_{k+1}\leq C)$ is sent to the control unit, a division process has been completed.

This completes the description of the apparatus which performs a digital division process in a digital computation device. The described process of the apparatus can be realized with conventional digital pulse circuits or sequential switching circuits. The described process used in the apparatus described represents the best known use of the invention. The invention is particularly useful to find the reciprocal of a constant whose convergence rate of the power series of $1/B$ is close to one.

What is claimed is:

1. Apparatus for digital division computation for producing a quotient by performing successive multiplication operations comprising:
   control means comprised of sequential circuitry for performing digital divisional operations to obtain a reciprocal of a constant,
   divisor register means comprised of a row of associated flipflops for receiving and storing a digital divisor quantity B,
   dividend/quotient register means comprised of a row of associated flipflops for receiving and storing a digital dividend quantity A,
   means for simultaneously transmitting a digital divisor quantity B to said divisor register means and a digital dividend quantity A to said dividend/quotient register means,
   multiplication means for iteratively determining initially digital acceleration constants $a_i$ and secondly digital quantities $q_i$ computed successively from digital contents of a pseudoradix/q register comprised of two rows of associated flipflops,
   counter means comprised of structured circuitry which performs the operation of counting the number of signals with feedback loops responsive not only to its present input but also to inputs that may have been presented previously,
   adding means comprised of sequential logical circuitry which performs the operation of adding two digital quantities,
   multiplying means comprised of sequential logical circuitry which performs the operation of multiplying two digital quantities,
   determination logic $a_i$ means for determining the acceleration constant $a_i$ from the received digital quantity $q_i$,
   said multiplication means being interconnected iteratively with said divisor register means to receive and store a digital pseudoradix $D^n$ and a digital quantity $q_i$ in said pseudoradix/q register,
   means for transmitting a signal from said control means to said determination logic $a_i$ means to initiate said iterative process to sequentially transmit a signal each time from said determination logic $a_i$ means, means for performing a digital evaluation process of the function $q_{i+1}=h_{n+i}(q_i,a_i)=-\{D^{n+l+i}-(a_i+1)(D^{n+i}+q_i)\}/D^{l+i}$ for $i=0,1,2,\ldots$ where $q_o=B-D^n$, said control means initiating said counter means to count by one each time when said determination logic $a_i$ means sends a signal $s(D-1>a_i)$ when the condition $D-1>a_i$ occurs, said control means actuating said determination logic $a_i$ means to multiply the content of said dividend/quotient register by the digital quantity, one plus a digital acceleration constant from determination logic $a_i$ means, said iterative process continuing until a digital quantity $q_f$, representative of the smallest possible fraction of B, is determined by performing a digital evaluation of the function $q_f=g_{n+i}(q_i,a_i)=\{D^{n+l+i}-a_i(D^{n+i}+q_i)\}/D^{n+l+i}$ and a completion of the multiplying operation of the content of said dividend/quotient register by the acceleration constant when a signal $s(D-1=a_i)$ is generated by said determination logic $a_i$ means when the condition $D-1=a_i$ occurs where $q_i$ and $a_i$ denote the last iterative values, said multiplication means actuating said control means to bypass said iterative process when a signal $s(D-1>a_o)$ is generated from said determination logic $a_i$ means when the condition $D-1>a_o$ occurs, namely when the present content of said pseudoradix/q register which contains said quantity $q_o$ becomes said quantity $q_f$, a determination logic $b_k$ means which, upon receipt of digital quantity $q_f$, is activated by said control means to sequentially provide a digital acceleration factor $b_k$ by the process of a squaring operation $Q_{k+1}=Q_k^2$ and adding operation $b_k=1+Q_{k+1}$ for $k=0,1,2,\ldots$ where $b_o=1-q_f$ and $Q_o=q_f$, and means for transmitting said acceleration factor $b_k$ to said dividend/quotient register means to sequentially multiply it with the present content of said dividend/quotient register means until a predetermined digital accuracy of the quotient has been accumulated when a signal $s(Q_{k+1}\leq C)$ is generated by said determination logic $b_k$ means when the condition $Q_{k+1}\leq C$ occurs where C denotes a digital quantity less than the least significant digit of said divisor register.

2. The apparatus for digital division computation set forth in claim 1 wherein:

said multiplication means comprises a subdivision table.

3. The apparatus for digital division computation set forth in claim 2 wherein:

said determination of $a_i$ means comprising connection arrangement for receiving a signal from said control unit to start successive comparisons of the quantity $q_i$ in said pseudoradix/q register with digital constant contents of said subdivision table by a comparator, means comprising a combinational logic circuitry that compares the magnitudes of two digital numbers and that outputs a signal indicating a magnitude relationship between the two numbers, said successive comparisons continuing until a digital acceleration constant $a_i$ that is an index of the subdivision table is determined, upon determination of said acceleration constant, and transfer of the $a_i$ to said iterative process and determining a magnitude relationship between the $a_i$ and the digital number $D-1$ where D denotes a base radix.

4. Apparatus for digital division computation to produce a quotient by performing a successive multiplication operation by having a control unit, comprised of sequential circuitry, for controlling a sequence of digital division operations to obtain a reciprocal of a constant comprising:

a clock unit, comprised of square wave form generating circuit, for generating periodical clock pulse to regulate the sequence, a divisor register, comprised of a row of associated flip-flops, for receiving and storing a divisor quantity B, an adding unit for receiving two digital numbers, means for adding these two numbers with each other and storing the result of the adding operation, a multiply unit for receiving two digital numbers, means for multiplying these two numbers with each other and storing the result of the multiplying operation, a pseudoradix/q register, comprised of two rows of associated flipflops, for receiving a pseudoradix and a digital quantity $q_i$, storing them, and holding intermediate results of the evaluation process of functions $h_{n+i}(q_i,a_i)$ and $g_{n+i}(q_i,a_i)$ by performing shifting and negating operations, a dividend/quotient register, comprised of a row of associated flipflops, for receiving and storing the dividend A, receiving a digital acceleration constant $a_i$ or a digital acceleration factor $b_k$, means for multiplying the content of this register by the acceleration constant $a_i$ or the acceleration factor $b_k$ through utilizing the multiply unit, and storing the result of the multiplication, an $a_i$ determination logic unit, comprised of sequential circuitry, for receiving a digital quantity $q_i$, comparing $q_i$ with digital contents of a subdivision table, determining an interval of a pair of two adjacent contents of the table, such that the interval contains $q_i$, by a comparator, composed of combinational logic circuitry, in a predetermined comparing order, selecting the table entry index of the upper limit content of the interval as a digital acceleration constant $a_i$ through an encoder, comparing an equality of $a_i$ with the digital constant $D-1$ or D, and outputting the acceleration constant and a signal that indicates a magnitude relationship between the $a_i$ and the constant $D-1$, the comparator means receiving two digital numbers, comparing the magnitudes of these two numbers and generating a signal that indicates a magnitude relationship between the two numbers, the encoder means receiving a signal and converting it a digital nunber, a counter, comprised of circuitry with feedback loops, for receiving initially a signal from the control unit to reset it and subsequently a signal of an iteration count from the $a_i$ determination logic unit to count up each time whenever the signal is generated, a $b_k$ determination logic unit for receiving a digital quantity $q_f$ (regarded as $Q_o$) from the pseudoradix/q register, computing $b_o$ as $1-q_f$, sending $b_o$ to the dividend/quotient register, squaring the present $Q_k$, holding the squared result $Q_{k+1}=Q_k^2$ in the pseudoradiox/q register, computing $b_{k+1}=1+Q_{k+1}$, sending $b_{k+1}$ to the dividend/quotient register, comparing $Q_{k+1}$ with a predetermined digital constant C by a comparator, repeating the squaring operation and the following operations by increment k by one if a signal generated by the comparator indicates that $Q_{k+1}$ is greater than C, otherwise ending the division process if a signal generated by the comparator indicates that $Q_{k+1}$ is less than or equal to C.

5. The apparatus for digital division computation set forth in claim 4 wherein:

the successive multiplication means has an operational connection arrangement for resetting initially the pseudoradix register and the counter with a predetermined pseudoradix $D^n$ and zeros by the control unit, respectively, adding the negated pseudoradix-$D^n$ to the digital quantity in the divisor register by utilizing the adding unit and storing the result $q_o$ of the addition into the q register by actuating a syncronized clock pulse, comparing the $q_o$ with contents of the subdivision table by a subsequently syncronized clock pulse, obtaining a digital acceleration constant $a_i$ and a signal, $s(D-1<a_i)$, $s(D-1=a_i)$ or $s(D-1>a_i)$, of the magnitude relationship between $a_i$ and $D-1$ from the $a_i$ determination logic unit, using the ORed signal from an OR logic of signals, $s(D-1=a_i)$ and $s(D-1>a_i)$, with syncronized clock pulses to count the counter up, evaluating the function $h_{n+i}(q_i,a_i)$ or $g_{n+i}(q_i,a_i)$ namely to form the digital quantity $(D^n+q_i)$ from the pseudoradix and q registers via an AND logic, performing a multiplication of $(D^n+q_i)$ with an multiplier $a_i$ or $(a_i+1)$ depending on a generated signal, $s(D-1=a_i)$ or $s(D-1>a_i)$, from the $a_i$ determination logic unit via an AND logic utilizing the multiply unit, adding the digital quantity $-D^{n+1}$, being shifted result by one digit, of the contents in the pseudoradix register to the result of the multiplication by the adding unit, digit shifting the resulted quantity of the addition by $(n+1)$ digits or by one digit depending on the generated signal $s(D-1=a_i)$ or $s(D-1>a_i)$, from the $a_i$ determination logic unit, storing the resulting quantity of the digit shifting into the q register with syncronized sequential operational signals, such as add, multiply, add and digit shift, with clock pulses from the control unit, multiplying the content of the dividend/quotient register by an acceleration constant $a_i$ or $a_i+1$ from the $a_i$ determination logic unit utilizing the multiply unit, storing the result of the multiplication into the dividend/quotient register being actuated by a syncronized clock pulse, and sending an ORed signal from an OR logic of $s(D-1=a_i)$ or $s(D-1>a_i)$ from the $a_i$ determination logic unit to the control unit in order to actuate a multiplication of the content of the dividend/quotient register by a multiplier $b_k$.

6. The apparatus for digital division computation set forth in claim 5 wherein:

said multiplication of the multiplicant $(D^n+q_i)$ by the multiplier $a_i$ or $(a_i+1)$ and said multiplication of the multiplicant that is the content of the dividend/quotient register by the multiplier $a_i$ or $(a_i+1)$ being a digit shift of the multiplicant by one digit to the left and a subtraction of the original multiplicant from the shifted multiplicant when the multiplier is $D-1$.

7. The apparatus for digital division computation set forth in claim 4 wherein:

the $a_i$ determination logic unit comprises a subdivision table in a chosen base radix D, comprised of a set of registers, a selection matrix, comprising a set of AND logics, that is opening a data path for a pair of two adjacent contents of the table to a comparator section that generates a signal of the comparison result between a digital quantity $q_i$ and the pair of the contents, namely $s(i^{th} \text{content}<q_i)$, $s((i+1)^{th} \text{content}>q_i)$ or $s((i+1)^{th} \text{content}<q_i$ and $i^{th} \text{content} \geq q_i)$ where the adjacent contents consist of the $i^{th}$ content and the $(i+1)^{th}$ content, a counter initialized by the control unit when a division has started is counted by one whenever an ORed signal from an OR logic of the signals, $s(i^{th} \text{content}<q_i)$ or $s((i+1)^{th} \text{content}>q_i)$, is generated and outputs the present count $v$ to a shift bit generator, the shift bit generator dictates a shift register shifting to the left or to the right depending on a received signal, $s(i^{th} \text{content} <q_i)$ or $s((i+1)^{th} \text{content}>q_i)$ by $D/2^{v+1}$ bits, the shift register initialized by the control unit, when a division has started in order to select the $(D/2)^{th}$ content and the $(D/2+1)^{th}$ content of the table, provides two selection bits for the selection matrix, an encoder generates an acceleration constant $a_i$ by converting the current selection bit position in the shift register when a signal, $s((i+1)^{th} \text{content}<q_i$ and $i^{th} \text{content} \geq q_i)$, is generated, and a comparator provides a signal indicating the magnitude relationship between the acceleration constant $a_i$ and the digital constant $D-1$.

8. The apparatus for digital division computation set forth in claim 4 wherein:

said subdivision table comprises a set of registers $s_a$ for $a=1,2,3,\ldots, D$ and $D+1$ having capacity of finite digits defined by $S_i(D-1)D'$,
$S_a=(2D-2_a+1)D'/(2a-1)$ for $a=2,3,4,\ldots,$ and D,
$S_{D+1}=0$ where D and D' denote a base radix and a pseudoradix, respectively.

9. The apparatus for digital division computation set forth in claim 4 wherein:

said divisor B means causes the upper significant digit string $B_1$ to be split from the original divisor digit such a way $B=B_1D^m+B_2$ where $D^m$ is a pseudoradix that indicates the digit boundary between $B_1$ and $B_2$, when $m=0$, $B_1$ is equal to B so that $B_2=0$.

10. The apparatus for digital division computation set forth in claim 4 wherein:

said evaluation process of the functions $h_{n+i}(q_i,a_i)$ and $g_{n+i}(q_i,a_i)$ comprises the evaluation execution order:

$$h_{n+i}(q_i,a_i) = -\{D^{n+1}-(a_i+1)(D^n+q_i)\}/D$$

and $$g_{n+i}(q_i,a_i) = \{D^{n+1}-a_i(D^n+q_i)\}/D^{n+1}.$$

* * * * *

UNITED STATES PATENT AND TRADEMARK OFFICE
CERTIFICATE OF CORRECTION

PATENT NO. : 4,364,115
DATED : Dec. 14, 1982
INVENTOR(S) : Hitohisa Asai

It is certified that error appears in the above—identified patent and that said Letters Patent is hereby corrected as shown below:

At column 5, line 30, " $S_{D-a}$ " should read -- $S_{D-1}$ -- .

At column 8, line 28, " $1+qb^{24}$ " should read -- $1+q_b^{2^r}$ -- .

At column 9, line 55, " When " should read -- Then -- .

Signed and Sealed this

Seventeenth Day of May 1983

[SEAL]

Attest:

DONALD J. QUIGG

Attesting Officer    Acting Commissioner of Patents and Trademarks